United States Patent [19]

Liebig

[11] 4,293,259
[45] Oct. 6, 1981

[54] LOCKING TOGGLE BOLT

[76] Inventor: Heinrich Liebig, Wormserstrasse 23, D-6102 Pfungstadt, Fed. Rep. of Germany

[21] Appl. No.: 965,472

[22] Filed: Dec. 1, 1978

[30] Foreign Application Priority Data

Dec. 24, 1977 [DE] Fed. Rep. of Germany ....... 2758091
May 2, 1978 [DE] Fed. Rep. of Germany ....... 2819289

[51] Int. Cl.³ .......................................... F16B 13/08
[52] U.S. Cl. ...................................... 411/32; 411/38; 411/65
[58] Field of Search .................. 85/69, 79, 73–76, 85/86, 87, 3 R, 3 K, 67, 70; 411/32, 65, 64, 63, 38

[56] References Cited

U.S. PATENT DOCUMENTS

| 626,040 | 5/1899 | Rowlands | 85/73 |
| 703,796 | 7/1902 | Lakhovsky | 85/73 |
| 1,120,409 | 12/1914 | Rohmer et al. | 85/67 |
| 1,878,600 | 9/1932 | Pleister | 85/71 |
| 2,392,491 | 1/1946 | Moran | 85/73 |
| 3,283,640 | 11/1966 | Ono | 85/69 |
| 3,296,919 | 1/1967 | Williams | 85/73 |
| 3,403,594 | 10/1968 | Newell | 85/79 X |
| 3,735,665 | 5/1973 | Mortensen | 85/71 |

FOREIGN PATENT DOCUMENTS

| 2348873 | 4/1975 | Fed. Rep. of Germany | 85/69 |
| 1030453 | 3/1953 | France | 85/87 |
| 1268624 | 6/1961 | France | 85/79 |
| 483571 | 2/1970 | Switzerland | 85/75 |
| 343992 | 3/1931 | United Kingdom | 85/67 |
| 436238 | 10/1935 | United Kingdom | 85/74 |

Primary Examiner—Ramon S. Britts

[57] ABSTRACT

Toggle which can be set against the face of an undercut provided within a bore, and having an elongated bolt, on whose bore-internal end locking elements are mounted, which, by means of a conical component disposed for axial displacement on the bolt, can be expanded outwardly from a position in which they are within the diameter of the bore to a position in which they engage the face of the undercut. The locking elements are supported on a bottom piece on the end of the bolt within the bore, and are in the form of segments of a thick-walled cylinder when in the retracted position. A variety of anti-rotational means are provided to prevent the toggle from turning during the setting operations.

13 Claims, 8 Drawing Figures

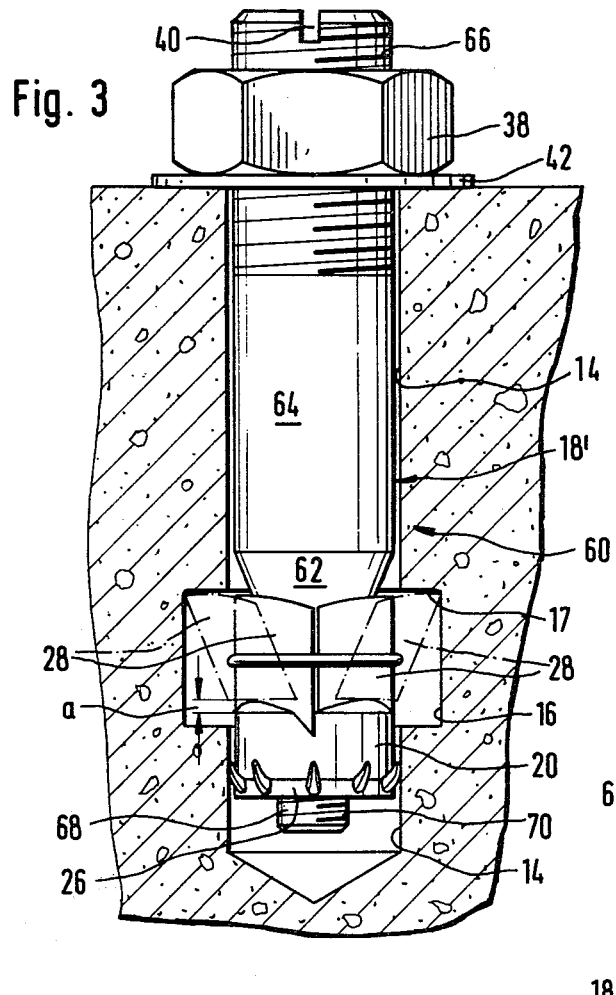
Fig. 3
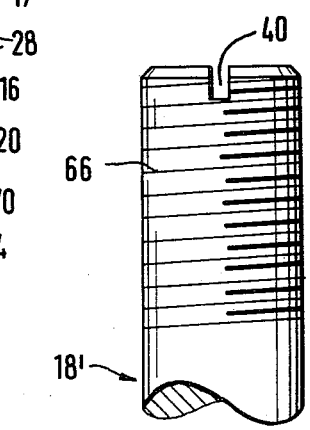
FIG. 4
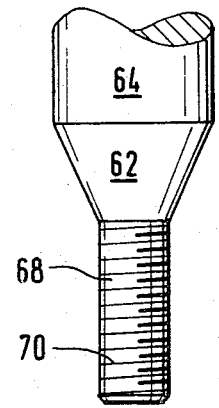

LOCKING TOGGLE BOLT

BACKGROUND

The invention relates to a toggle which can be locked in a bore provided with a radial undercut surface in a manner which is positive and largely free of spreading pressure, having a toggle body of a diameter corresponding substantially to the diameter of the bore and introducible into the bore, locking elements being mounted thereto, whose ends facing the bore orifice can be deflected from a position within the diameter of the bore to a position in which they project at least partially beyond the diameter of the toggle body to engage the undercut surface of the bore.

A toggle of this kind is known (German Offenlegungsschrift No. 25 35 066), in which the toggle body consists of a heavy sleeve insertable into the bore, and provided in the area of its bore-internal end with recesses in which fluke-like locking elements are disposed which are biased by a spring to the expanded position in which their ends facing rearwardly toward the bore orifice are capable of engaging the undercut surface of the bore. Prior to the introduction of this toggle into the corresponding bore, the locking elements are held by a ring in the retracted position, the ring being disposed on the outside of the locking elements such that, when the toggle is inserted into the bore, the ring is forced downwardly by the locking elements. Alternatively, embodiments of the toggle are known in which locking elements carried radially displaceably in recesses in the sleeve are displaceable by a cam or spreader from the position in which they are withdrawn within the bore diameter to the expanded locking positions. For the locking action, it is then necessary to introduce a special tool into the toggle whereby the cam or spreader is rotated. For the fastening of workpieces, these known toggles have in their end facing the bore orifice an internal thread into which screws can be driven to hold the workpiece. In any case, however, the procedure in the known toggles is first to place the toggle in the prepared and undercut bore, then place the workpiece in the desired position over the bore, and then pass the bolt through the hole in the workpiece into the toggles and tighten it. This procedure is not only complex, but it also has the disadvantage that one must check carefully before fastening the workpiece to see whether all of the bores are actually provided with a toggle. Because if due to an oversight no toggle has been placed in one or more bores, the workpiece, which possibly may already have been fastened with several bolts, must again be taken off and, after the missing toggles have been installed, it must be fastened on again.

In contrast, the object of the invention is to create a toggle which can be locked positively and without expansive pressure against an undercut surface of a bore, and which does not have to be installed before mounting the workpiece but can be inserted through the hole in the workpiece into the bore. Furthermore, the locking elements are to be positively expanded to the locking position without requiring a special tool for the purpose.

Setting out from a toggle of the initially mentioned kind, this problem is solved in accordance with the invention by providing the toggle with a bottom piece of relatively short length disposed on the bore-internal end of an elongated bolt, and supporting the bore-internal ends of the locking elements which close together to form a thick-walled cylindrical sleeve surrounding the bolt, providing the bolt with a component tapering conically towards the interior bottom of the bore and entering between the ends of the locking elements facing the bore orifice so that, when the bottom piece is displaced towards the bore orifice the rearward ends of the locking elements will be positively deflected radially outwardly, and providing the bolt on its outer end with a bolt head or a nut screwed onto a thread of the bolt. The toggle thus constructed is insertable through a hole in a workpiece, and the bolt head or nut plus washer, if any, projecting from the hole in the workpiece will show at a glance where a toggle has been set and where one has yet to be placed.

The conically tapering component is preferably formed of the conically tapering bore-internal end of an elongated sleeve placed longitudinally displaceably on the bolt, its length being approximately equal to the distance between the bore undercut and the outer surface of the workpiece being fastened, plus the tightening distance required for the expansion of the locking elements. Since the length of the sleeve depends on the depth of the undercut surface in the bore and the thickness of the workpiece to be installed, it is recommendable to use for the creation of the undercut a tool which has a depth stop which is adjustable or adjusted to the required depth of the undercut, holding the workpiece in place so as to allow for its thickness during the boring of the undercut, or, if the workpiece is too heavy or bulky, using a gauging collar corresponding to the thickness of the workpiece.

In an alternative embodiment of the invention, the conically tapering component is formed of a conical section of the bolt itself, whose shank adjoining the conical section on the bore orifice side has a diameter equal to or only slightly smaller than the diameter of the bore. In this manner, a large cross-sectional area is made available in the critical, shear-stressed portion of the bolt.

To prevent the toggle from turning as a whole when it is being set in the bore, so that the locking elements are unable to expand and engage the undercut surface, the bottom piece has, in further development of the invention, antirotational means engaging the wall of the bore. These means can be, for example, resiliently deformable claws projecting radially star-wise from a ring disposed on an indent in the bottom piece, it being possible to produce the ring integrally with the holding claws from plastic, since then it is possible to make it inexpensively by the injection molding process.

Alternatively, antirotational means can be provided which are stamped out of spring metal and are similar to the star lock washers used for locking machine screws, or they can be made of spring wire with projecting extremities.

It is recommendable to provide a screw thread on the bolt, at least on its bore-internal end, and to drive it into a complementary thread in the bottom piece. The effective bolt length can thereby be varied to a certain extent and, if a headed bolt is used, the threaded connection serves for the drawing up of the bottom piece when the locking elements are to be expanded.

If a nut is provided which is threaded onto a thread on the outside end of the bolt, it is recommendable that the length of the thread on the bolt be at least equal to and preferably longer than the tightening length required for the spreading of the locking elements.

However, in the case of an embodiment in which a sleeve is placed on the bolt, the bolt can also be a headless bolt threaded on its full length. In either case, it is recommendable to provide a screwdriver slot in the outer end surface of the bolt for engagement by a screwdriver or other such tool.

In a further development of the toggle of the invention, a circumferential radial groove is provided in the outer sides of the locking elements confronting the bore wall, and a resiliently expandable ring is disposed therein to hold the locking elements in the retracted position; the ring can be either a full ring of rubber elastic material, or preferably a jump ring of spring steel wire.

The locking elements can be supported on the bottom piece by providing the bottom end of each locking element supported by the bottom piece with at least one projection which engages a matching recess in the bottom piece and thus prevents the locking element from turning circumferentially relative to the bottom piece, without interfering with the expansion of the upper ends of the locking elements. Alternatively, two projections can be provided on each locking element, preferably adjacent the lateral edges thereof, engaging recesses in the bottom piece.

In an embodiment of the toggle of the invention in which a sleeve is provided, the sleeve, as previously stated, must be adapted relatively precisely to the given depth of the undercut surface and to the thickness of the workpiece. Less critical in this regard is an embodiment in which the sleeve is axially deformable to a certain extent under the action of axial forces. A sleeve that is too long is then compressed axially by the required additional amount simply by tightening the bolt head or nut, as the case may be.

In the simplest case, the sleeve has for this purpose at least one circumferential groove reducing its wall thickness, the remaining thickness of the sleeve wall being so small that it is compressible in the necessary manner.

Alternatively, an annular element which is compressible in the axial direction can be provided between the sleeve and the screw head or nut provided on the bolt.

The securing of the toggle against rotation in the bore when it is being set, i.e., when the locking elements are being expanded, is brought about in another embodiment of the invention by the fact that the component which tapers conically towards the interior of the bore and is inserted inside of the locking elements is a spreader cone of relatively great angle of conicity which is disposed on the bolt, and this spreader cone is joined to an additional spreader cone whose tapered end points toward the bore orifice, and whose angle of conicity is smaller than that of the first spreader cone; the latter tapered end is inserted into the bore-internal end of a sleeve which is also disposed for longitudinal displacement on the bolt and is divided by slots into spreadable segments along at least part of its length. The deformation resistance of the ring, together with the resistance, if any, which the mounting of the locking elements on the bottom piece offers to the expansion of the locking elements, is made such that it offers to the expansion of the locking elements a resistance which is greater than the resistance offered by the segments of the slotted sleeve to expansion. The expandable ring holding the sleeve segments together and selected in the manner described above as to its resistance to deformation by expansion, in conjunction with any additional resistances to the expansion of the locking elements, assures that the spreading of the sleeve and that of the locking elements will take place in the required sequence.

In an advantageous further development of the invention, the spreader cone of greater angle of conicity is joined to the spreader cone of the smaller angle of conicity by a spacer element which is deformable in the axial direction and whose resistance to deformation by axial compression is greater than the resistance which is offered by the ring holding the locking elements together, plus the resistance, if any, offered by the means whereby the locking elements are held on the bottom piece, to the expansion of the locking elements. This spacing element has the purpose of permitting an additional axial tightening of the already outspread locking elements in case the locking elements have not yet been drawn all the way to the undercut surface after complete expansion in the installation procedure, so that such a toggle would have a slight looseness in the axial direction. By additional turning of the nut on the bolt or of the head of the bolt, as the case may be, such a toggle can then be tightened and installed under axial tension by the deforming of the spacing element until the locking elements are completely engaged.

The bottom piece bearing the locking elements is preferably in the form of a short, cylindrical body in whose upper surface facing the bore orifice pockets are formed which are engaged by projections extending into them from the bottom ends of the locking elements. The locking elements are secured against rotation by these projections.

To prevent the bottom ends of these projections from being forced against the bolt when the locking elements are expanded to the locking position, thereby damaging the thread whereby the bolt is held in the bottom piece, provision is made in a further development of the invention for the pockets to be closed off from the bore receiving the bolt, at least in their bottom portion and for the projections to be correspondingly reduced in thickness at their extremities.

Alternatively, the projection can also be made thinner overall, so that it will have the thickness of the terminal portion over its entire length, for example. A separately made ring is then inserted into the interstice between the bolt and the projection.

At the same time, it is recommendable for the pockets in the bottom piece and the holding projection of the locking elements to be provided with matching cross-sectional shapes differing from the circular cross section, in order to assure that the locking elements will be fixed in correct alignment with the bottom piece.

The projections are preferably integral with the locking elements and have in the area where they join the locking element a reduced cross section permitting the locking element to be bent in the desired direction relative to the projection. Such a construction of the expandable mounting of the locking elements on the bottom piece is very easy and inexpensive to realize, since it avoids the need for complex hinging involving links and journals.

The bottom faces of the locking elements are preferably flat surfaces at right angles to the longitudinal central axis of the toggle, while the end face of the bottom piece supporting the locking elements is beveled in the areas confronting their end faces in such a manner as to accommodate the anticipated bending of the locking elements. When the toggle is in the installed state, the bottom faces of the locking elements are therefore provided with a broad area of support on the beveled portions of the bottom piece, thereby assuring that they will have a broad base capable of withstanding heavy stresses.

The spreader cone of large angle of conicity and the spreader cone of small angle of conicity as well as the spacing element are preferably combined into a single, double conical spreading element so as to simplify the assembly of the toggle, although it would, of course, be also fundamentally possible to make these parts separately and assemble them individually. Then, however, care would have to be taken so that they would be unable to be turned relative to one another in the assembled toggle.

For the sake of simple and inexpensive manufacture, the spreader cones and the spacing element can be injection molded in one piece of plastic.

The spacing element is then desirably formed of at least two, preferably three or more legs disposed at equal angular intervals, joining together the two spreaders.

Alternatively, the spacing element can also be in the form of an axially collapsible sleeve at whose opposite ends the two separately made spreade cones are disposed in a non-rotatable manner. In this case the sleeve can be, for example, a thin sleeve of sheet metal, while the spreaders can again consist of plastic or alternatively also of metal.

Spreader cones made of metal can also be combined with a sleeve made of plastic, this sleeve then constituting the deformable spacing element.

In order to assure that the parts of the toggle which are arranged successively axially on the bolt will be unable to turn relative to one another when the toggle is tightened up, thereby impairing the setting operation, at least one rib-like projection is provided which extends from the conical spreader surface and engages the gap between two locking elements or the gap between two spreading segments of the sleeve.

In this case it is recommendable for the ribs of the spreader facing the locking elements to extend so far beyond the bottom end of the spreader towards the bottom piece that their bottom ends will just engage the bottom piece when the locking elements are in the properly expanded locking position. The projecting ends of these ribs serve as stops to prevent the spreader cone from being driven too far within the locking elements, and to prevent the locking elements from being spread open beyond the locking position.

Lastly, it is recommendable to provide the spreader cone engaging the spreading segments of the sleeve with a radially projecting circumferential bead which is engaged by the free ends of the spreading segments of the sleeve after they have been spread to a given extent. The bead also acts as a stop to prevent excessive expansion of the segments of the sleeve.

The invention will be further explained hereinbelow in conjunction with the drawing representing a number of its embodiments, wherein:

FIG. 3 is a view similar to that of FIG. 1 taken through a second embodiment of the toggle of the invention;

FIG. 4 is a side view of the bolt of the toggle of FIG. 3;

Figure 1:
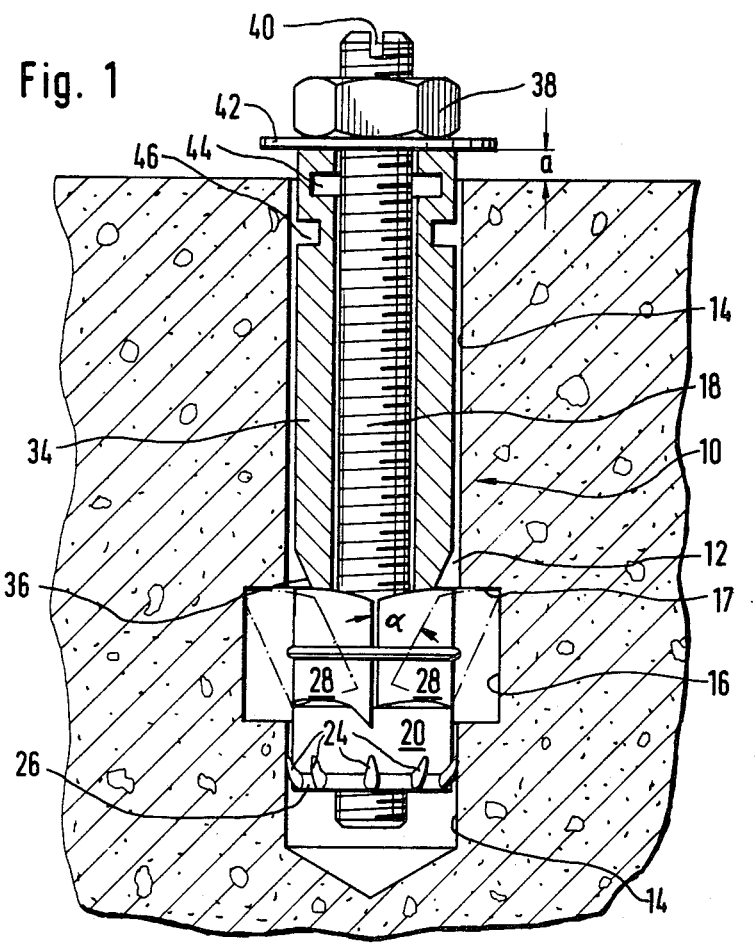
FIG. 1 is a side elevational view taken through a first embodiment of a toggle of the invention inserted in the retracted state into an undercut bore, the extended position of the locking elements being indicated by broken lines.

The toggle shown in FIG. 1 and designated in its entirety by the reference number 10, is to be anchored in a bore 12 which consists of a cylindrical pilot bore 14 and an undercut 16 situated at a distance from the orifice of the bore and having a surface 17 facing downwardly toward the bottom of the bore.

The toggle 10 has an elongated bolt 18 which in the illustrated case is threaded on its entire length, and on whose bore-internal end there is threaded a bottom piece 20 which is only slightly smaller than the diameter of the pilot bore 14. The bolt 18 can therefore be turned in and out of the bottom piece 20. The bottom piece has at its bottom end portion an antirotational means in the form of a ring 26 mounted on an indent 22 and having claws 24 projecting radially beyond the diameter of the pilot bore. The ring 26 can be injection-molded of plastic in one piece with the claws 24, but it can also be made of spring metal. When the toggle 10 is inserted into the bore, the claws 24 flex away from the directon of insertion, so that they do not interfere with the insertion of the toggle into the bore 12. However, when the bolt 18 is turned, the claws engaging the rough walls of the bore offer sufficient resistance to the turning of the bottom piece 20 to prevent the latter from turning with the bolt. On the upper end of bottom piece 20 i.e., the end that faces the orifice of the bore, three locking elements 28 are supported at equal angular intervals about the bolt; when gathered together in the insertion position shown in FIG. 1 they form a thick-walled cylinder which is divided, however, into the three locking elements 28 by three seams extending longitudinally. A resiliently expandable ring 32 inserted into a groove 30 cut circumferentially into the outside surface of the locking elements 28 holds the locking elements together in the cylindrical form shown. The locking elements are of such thickness that the cylinder which they form in position for insertion has a slightly smaller diameter then the bore, and possibly even slightly smaller than the diameter of the bottom piece, so that the assurance is provided that, upon introduction into the bore 12, the locking elements 28 will not be able to catch on an edge or projection.

Following the locking elements 32, an elongated sleeve 34 is placed loosely on the bolt 18; its inner end 36 tapers downwardly, so that when the bottom piece is drawn axially towards the bore orifice, the locking elements 28 will come into engagement with the tapered end of the sleeve and will spread out radially, with the expansion of the ring 32, to the position represented by the broken lines. The upper end surfaces of the locking elements 28 are therefore expanded to the diameter of the undercut face 17 and lock the toggle positively against the face of the undercut.

It can be seen that the required expansion of the locking elements 28 represented by the angle α corresponds to a particular movement a of the bottom piece 20. It can furthermore be seen in FIG. 1 that a particular length of the sleeve 34 is associated with a particular bore 12 having a particular depth of the undercut surface; that is to say, this length will be equal to the distance between the surface 17 and the orifice of the bore plus the thickness of a workpiece (not shown), plus the movement a required for the expansion of the locking elements, which depends on the taper of the end of the sleeve.

The sleeve 34 is held in the bore by the nut 38 threaded onto the outer end of the bolt 18, and a screwdriver inserted into a screwdriver slot 40 provided in the outer end of the bolt 18 can prevent the bolt from turning while the nut 38 is being turned. The washer 42 shown between the nut 38 and the sleeve 34 transmits the tightening force to the surface of the workpiece being bolted in place.

In FIG. 1, the tightening distance a by which the bottom piece 20 must be driven against the tapering end 36 of the sleeve 34 in order to produce the required expansion of the locking elements 28 is represented, for the sake of clarity, as a gap between the washer 42 and the surface of the material in which the toggle 10 is to be fastened. Actually, of course, the toggle is inserted into the bore 12 until the washer 42 engages the ground material, and when the nut 38 is tightened, the bottom piece 20 is drawn by the amount a towards the orifice of the bore.

Since the bolt 18 in the illustrated case is also in threaded engagement with the bottom piece 20, the nut 38 can also be replaced by a head forged on the bolt. The drawing up of the bottom piece 20 is then accomplished by driving the bolt into the bottom piece. On the other hand, the bottom piece can also be forged in one piece with the inner end of the bolt. Then, however, the drawing up of the bottom piece 20 has to be performed in any case, by means of a nut threaded onto the outer end of the bolt and engaging the sleeve 34.

The length of the sleeve must, as stated, be relatively precisely dimensioned in accordance with the depth of the undercut surface in the pilot hole and the thickness of the workpiece. An increase in the tolerance of this dimension is accomplished by means of the circumferential grooves 44 and 46 shown in the upper end portion of the sleeve. These grooves are so deep that the wall of the remaining part of the sleeve is axially deformable when the nut, or the bolt head if any, is drawn very tight, i.e., the effective length of the sleeve can be shortened. This is not only advantageous when the sleeve is unintentionally cut too long for the depth of the undercut surface in the bore, but is also permits compensation for unevenness on the undercut surface as well as a further tightening of the toggle fastening if it has become loose due to the breaking out of a pebble from the undercut surface. One alternative (not shown) to the grooves in the sleeve is the placement between the washer 42 and the sleeve 34 of a ring which is compressible axially, or of a second compressible sleeve.

Figure 2:
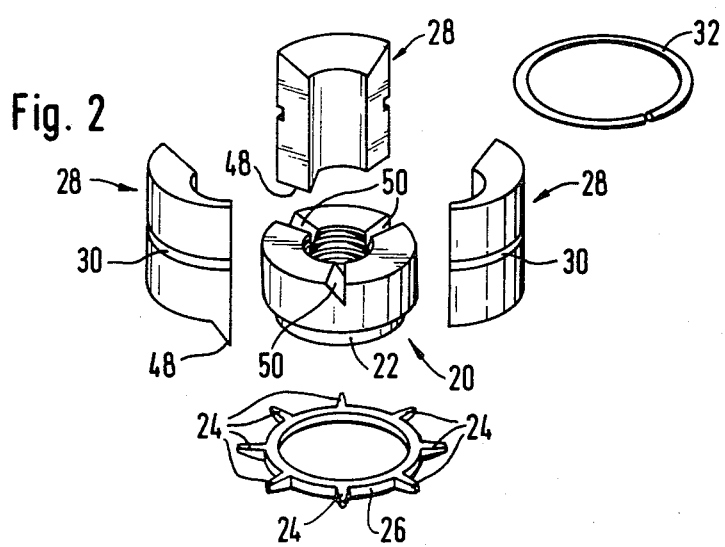
FIG. 2 is a perspective, exploded representation of the bottom piece and of the locking elements of the toggle of the invention which is shown in FIG. 1.

In FIG. 2, the bottom piece 20 with the antirotational ring 26 and the locking elements 28 as well as the expandable ring 32 that holds them together are also shown in an exploded, perspective view. It can be seen that each locking element has a spur 48 projecting downwardly from its bottom surface and engaging a matching notch 50 in the upper end surface of the bottom piece 20. This prevents the locking elements from turning relative to the bottom piece. Instead of one spur cooperating with one notch in the bottom piece, each locking element can be provided with two such spurs. The spur can also be disposed in the center part of the locking element instead of being on one side as illustrated. It can furthermore be seen that both end faces of the locking elements are beveled so that, when the locking elements are in the extended locking position, they are broadly supported i.e., over a broad area, on the top surface of the bottom piece at the one end and on the undercut face 17 at the other. The ring 32 which can be placed in the groove 30 in the locking elements 28 is, in the illustrated case, a jump ring of spring steel wire. Alternatively, however, a full ring of rubber-elastic material can be used.

The ring 26 which acts by means of the claws 24 against unintentional turning of the bottom piece 20 is, in the illustrated case, held by friction in the indent 22. If necessary, however, a positive engagement of the ring 26 with the bottom piece 20 can be accomplished by providing for the creation on the ring of, for example, a radially inward projecting lug with which there is associated a matching recess in the indent.

In the case of the variant toggle 60 shown in FIG. 3, parts serving the same function as those in the toggle 10 are identified with the same reference numbers. Consequently it will suffice to refer to the above description of toggle 10 with regard to such similar parts. The toggle 60 differs from toggle 10 mainly in that it does not have any sleeve corresponding to sleeve 34. The taper 62 required for the spreading of the locking elements is instead incorporated in the bolt 18', and the shank portion 64 adjoining the base of the taper 62 accordingly has a diameter that is the same as the outside diameter of sleeve 34. The shank portion 64 therefore is relatively thick, so that it is especially suitable for withstanding high shear stresses. Due to the greater thickness of the bolt 68 along the shank 64, the thread 66 for the nut 38 and the nut itself are correspondingly stronger, while the shaft portion 68 (FIG. 4) of bolt 18', adjoining the apex of the taper 62 has a thread 70 corresponding to the thread of bolt 18 of toggle 10.

Figure 5:
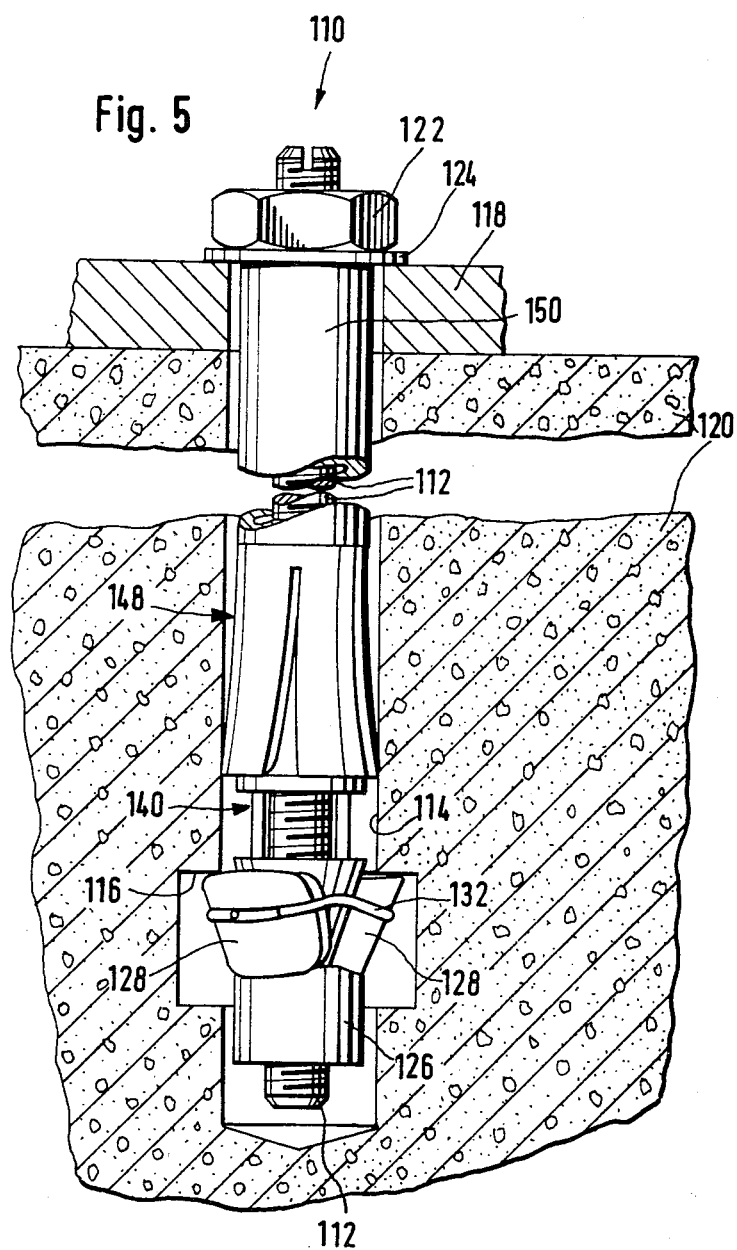
FIG. 5 is a side view of a third embodiment of a toggle of the invention set in an undercut bore.
Figure 6:
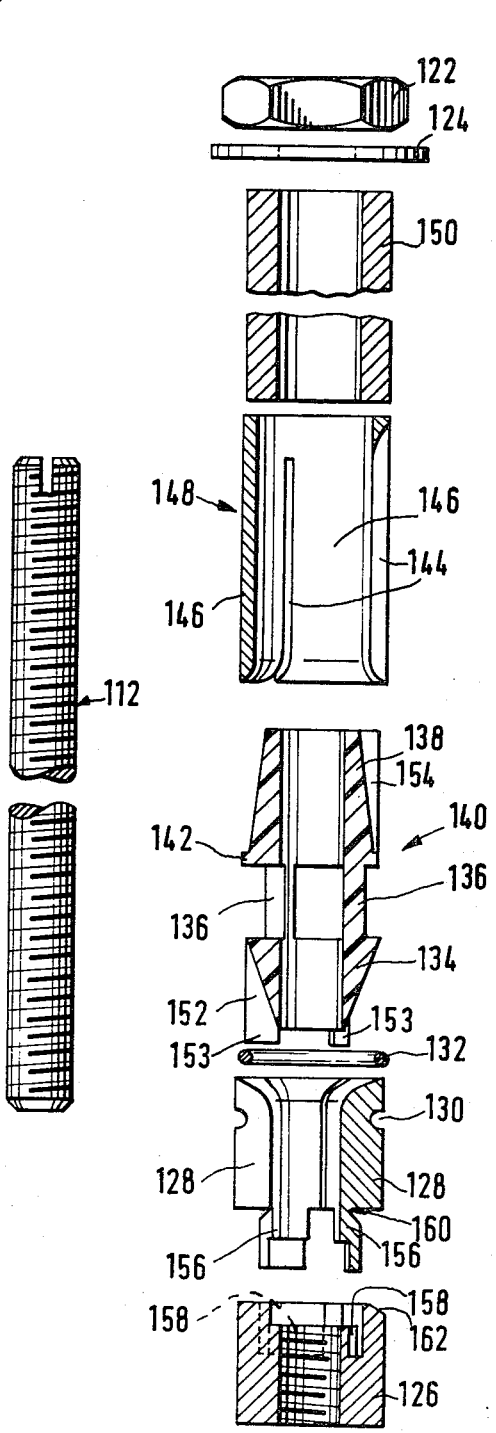
FIG. 6 is a side view, partially in cross section, of the toggle of FIG. 5.

The third embodiment of a toggle of the invention, which is shown in FIGS. 5 and 6 and designated it its entirety as 110, is composed of a series of components disposed successively on a threaded bolt 112 and having an outside diameter which, before the toggle is installed, corresponds approximately to the diameter of the pilot hole 114 of the bore having the undercut 116 or somewhat less, so that the toggle 110 in the retracted state can easily be introduced through a hole in a workpiece 118 into the corresponding bore 114, 116, in a ground material, which might be, for example, a concrete wall 120, and pushed into the bore until the nut 122 threaded on the outer end of the bolt 112, or a washer 124 underneath the nut, engages the wall. This toggle, therefore, is suitable for installation through a hole in a workpiece.

Figure 7:
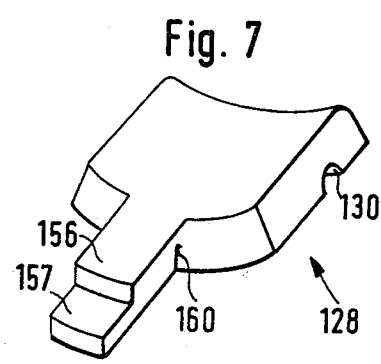
FIG. 7 is a perspective view of one of the locking elements whereby the installed toggle of FIGS. 5 and 6 engages the undercut surface of a bore.
Figure 8:
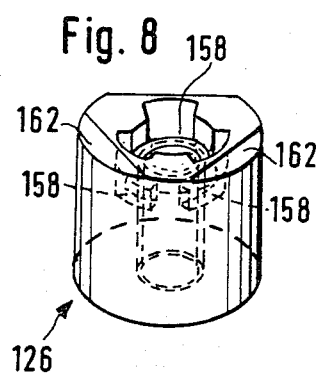
FIG. 8 is a perspective view of the bottom piece of the toggle of the invention, on which the locking elements of FIG. 7 are mounted, and FIG. 9 a side elevational view, half in cross section, of an expander cone for the toggle shown in FIGS. 5 and 6.

On the bore-internal or bottom end of the bolt 112, which in the illustrated case is constructed as a headless bolt threaded along its entire length, there is threaded a short, cylindrical bottom piece 126 (FIG. 8), on whose end surface facing the bore orifice a plurality of locking elements 128 are mounted for expansion and retraction in a manner to be further explained below (FIG. 7).

These locking elements 128 are thick cylinder segments which, when the toggle is in the uninstalled state, make up a thick-walled cylinder surrounding the bolt 112. In the illustrated case, three such locking elements 128 are provided. A circumferential groove 130 is created about the outside of the locking elements, and in it there is disposed an expansible metal ring 132 which holds the locking elements together and resists their expansion. Between the upper, free ends of the locking elements, the tapered end of a conical or truncatoconical spreader 134 disposed for longitudinal displacement along the bolt 112 is engaged, which is is combined, by means of a plurality of longitudinal legs 136 distributed at uniform angular distances, with an additional spreader 138 to form a double tapered spreading element 140. The spreader 138 is more slender than the spreader 135, i.e., its angle of conicity is smaller than the angle of conicity of the spreader 134. The spreading element 140 is in the illustrated case made in one piece of plastic, the legs 136 which hold the two spreaders in a spaced-apart relationship being deformable axially under a sufficiently great axial force, and thus permitting the two spreaders 134, 138, to approach one another. At the lower end of spreader 138, circumferential bead 142 projects radially from its tapered or conical surface. The tapered end of the spreader 138 projects into the bottom end of the bore of sleeve 148, which is divided by longitudinal slots 144 into spreading segments 148 whose wall thickness is smaller than the thickness of the locking elements, so that the spreading sections 146, in cooperating with the more slender spreader 138 under an axial force, are spread open before the locking elements 130 are spread open by spreader 134.

The sleeve 148 is adjoined in the illustrated toggle by a separate spacing sleeve 150. This spacing sleeve, which can also be in one piece with the sleeve 148 if desired, receives the shear forces occurring between the workpiece 118 and the ground material 120.

It is also to be noted that all of the components disposed between the bottom piece 126 and the washer 124 are made for longitudinal displacement on the bolt, and those between the sleeve 148 and the bottom piece 126 are additionally constructed so as to prevent their rotation relative to one another. The prevention of such rotation between the spreader 134 and the locking elements 128 is accomplished, for example, by at least one rib-like projection 152 provided on the conical surface of the spreader and engaging the gap between two adjacent locking elements. In like manner, at least one rib-like projection 154 on the conical surface of spreader 138 serves as the means for the prevention of rotation between this spreader and the slotted sleeve 148. In the embodiment illustrated, three such rib-like projections 152 are provided, whose bottom extremities 153 project beyond the inner end of spreader 134 toward the bottom piece 126 to such an extent that they touch the bottom piece when the locking elements reach their proper extended position, and then prevent any further penetration of the spreader 134 between the locking elements. The locking elements 128 are in turn provided on their bottom surfaces with projections 156 which engage pockets 158 in the upper end surfaces of the bottom piece. In this manner, therefore, the locking elements are also unable to be turned relative to the bottom piece.

From the foregoing explanations it is now apparent that the components disposed on the bolt 112 between the bottom piece 126 and the nut 122, or the washer 124 provided under the nut as the case may be, can be squeezed together axially by reducing the distance between the bottom piece and the nut, first the spreader 138 being forced into the sleeve 148 and expanding the sections 146 of the sleeve, which offer relatively little resistance to spreading, until they engage the wall of the pilot hole 114. The entire toggle is thus held against rotation in the bore. In the moment in which the sections 146 engage the bore wall, the resistance offered by the sections to the penetration of the spreader 138 increases, so that then the spreader 134 goes into action and spreads open the locking elements 128 with the expansion of the ring 132. The ring 132 is not only expanded as the spreading increases, but also bent in the increasing gap between the locking elements, as can be seen, for example, in FIG. 5.

As the spreading increases, the ring 132 then is bent between the locking elements, resulting in the offering of a higher resistance to the further spreading of the locking elements. It is apparent that in this manner it is possible to assure that the spreading of the locking elements 128 will not begin until the sections 146 have already engaged the wall of the pilot hole 114 with a certain pressure, securing the toggle 110 against rotation in the pilot hole.

The upper end faces of the locking elements are in this manner made to engage the undercut surface 116 of the bore 114, 116. Theoretically, it is conceivable that, if the distance between the undercut surface 116 and the surface of the workpiece 118 has not been precisely measured, the locking elements will have reached their fully outspread position before they have been drawn fully against the undercut surface 116. The entire toggle would then be loose and the workpiece 118 would not be pressed tightly against the ground substance 120. The legs 136 joining together the spreaders 134 and 138, however, are deformable axially, as stated before, so that any looseness can be eliminated by further tightening and the deformation of these legs. All that is required is that the resistance of legs 136 to deformation be such that they will not deform until the locking elements 128 have already been spread to the locking position. When the upper end surfaces of the locking elements 128 have engaged the undercut surface 116, the nut 122 is turned further, the annular groove 130 in the locking elements 128 for the ring 132 is compressed and the ring 132 is tightly gripped in the annular groove 130. The locking elements 128 and the ring 132 then form a substantially solid component whose locking elements are fixed in the locking position.

The extendable and retractable mounting of the locking elements 128 on the bottom piece 126 is accomplished by means of the projections 156 mentioned above, which are integral with the locking elements 128 and can have on their outside, at 160, directly in the area of transition to the locking element, a wedge-shaped notch whereby the cross section of the projection 156 is made so thin that it is possible for the projections 156 to be bent at these notches relative to the locking elements 128. When the locking elements 28 are in the fully expanded position, the wedge-shaped notch 160 is completely closed, preventing their further expansion. The remainder of the bottom surface of the locking elements is also in contact with the bottom piece 126 over a relatively broad area, the bottom piece being provided on its upper surface with correspondingly beveled surface areas 162. Since the projections 156 of the locking elements 128, which engage the pockets 158, will seek to swing inwardly towards the bolt 112 threaded into the bottom piece 126 when the locking elements are expanding, the pockets 158 are closed off from the bolt 112 in their inside terminal area, and the end portions 157 of the projections are accordingly reduced, i.e., they are thinner in the end portion than the portion adjacent thereto by the thickness of the wall separating the pocket 158 from the bolt 112. Alternatively, the projection can also be made thinner overall, so that it will then have over its entire length the thickness of the above-described reduced end portion 157. A separately manufactured ring is inserted into the gap which is thus formed between the bolt and the holding projections.

In the above-described embodiment, the bolt 112 is a headless threaded bolt whose inside end is threaded into the bottom piece and whose outside end is threaded into the nut 122. It is apparent that one of these threaded connections can be eliminated, i.e., that, for example, the nut 122 can be replaced by a head made integral with the bolt.

Alternatively, the bottom piece 126 can also be affixed to the bolt, in which case, however, the use of a nut on the outside end is essential.

Figure 9:
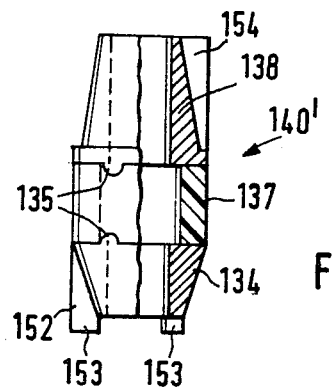

Lastly, FIG. 9 shows another spreading element 140' which is a variant of the spreading element 140 shown in FIG. 6. Here the spreaders 134 and 138 are made of metal, while the axially compressible spacer is formed by a ring 137 of plastic. The securing of the spreaders 134 and 138 against rotation relative to the ring 137 is accomplished in this case by means of projections 135 on the end surfaces of the spreaders confronting the ring 137, which engage complementary recesses in the end surfaces of the ring.

It is apparent from the foregoing description that the toggle of the invention, when it has been installed, is positively locked by the locking elements 128 against the undercut surface 116, i.e., that the bolt 112, when under tension, tightens the workpiece 118 to the ground material 120 by means of the nut 122 and the washer 124. If the toggle of the invention, as a variant from the representation given in FIG. 5, serves for the fastening of a workpiece threaded onto the outer end of the bolt, any forces of pressure or weight are transmitted to the ground material through the nut 122 and the washer 124.

Security against the rotation of the toggle 112 in the pilot hole can additionally be provided on the bottom piece 126 by providing the bottom end of the bottom piece with a radial indent (as in the case of the embodiments pursuant to FIGS. 1 and 3) which bears a ring having radial projections which are resiliently urged against the wall of the pilot bore 114 and in a claw-like manner secure the bottom piece 126 against rotation.

In the above explanations of the toggle 110, special emphasis has been placed on the requirement that the toggle of the invention be secured against rotation prior to the actual setting procedure, i.e., prior to the expansion and application of the locking elements to the undercut surface. In a particular design of the toggle, however, it can also be set without an antirotation means, or, to put it more correctly, without an antirotation means in the interior of the bore, if the toggle can be prevented, by means of a tool which can be applied externally, from rotation during the spreading of the locking elements. This possibility is provided, for example, if a nut threaded on the bolt serves for the setting of the toggle, and a screwdriver slot is additionally provided in the outer end of the bolt (see also the screwdriver slot 40 in toggles 10 and 60). When the nut is being tightened with a wrench, the blade of a screwdriver can be inserted into this slot and rotation can be prevented by holding the screwdriver steady, so that one might consider this slot also as an external antirotation means.

I claim:

1. A form-fitting connecting arrangement comprising in combination: a workpiece having an opening therethrough, an article having a cylindrical blind bore being axially aligned with said opening and an undercut surface extending essentially radially outwardly from said blind bore and at a certain distance from the orifice of said bore, and a toggle having an elongated bolt and a toggle body having a diameter corresponding substantially to the diameter of the bore, said opening having a transverse dimension at least as great as said diameter of the bore, said toggle being introducible through the opening into the bore, locking elements mounted on said toggle body and having ends facing the bore orifice, said elements being adapted to be swung from a position lying within the diameter of the bore into a position in which they project at least partially beyond the diameter of the toggle body and engage lockingly the undercut surface of the bore, said toggle body being of relatively low height and being mounted on the bore-internal end of said bolt at the blind end of the bore, said locking elements having bore-internal ends closing together on said bottom piece to form a thick-walled cylindrical sleeve enveloping said bolt, an elongated cylindrical sleeve arranged longitudinally displaceably around said bolt and having an end tapering conically towards the interior of the bore and engaging between the ends of the locking elements facing the bore orifice, so that, upon a displacement of the bottom piece in the direction of the bore orifice, the ends of the locking elements are swung positively radially outwardly, the length of said elongated sleeve equalling substantially said certain distance of said undercut surface from the orifice of said bore plus the thickness of the workpiece at said opening plus the length of said displacement of said bottom piece necessary for swinging said locking elements radially outwardly into locking engagement with said undercut surface, said bolt having on its outer end remote from said blind end of said bore means on said bolt for effecting said displacement and including means for providing a bearing surface with said workpiece.

2. The combination according to claim 1, wherein said bottom piece has means engaging the wall of the bore to prevent turning in the bore when the toggle is set.

3. The combination according to claim 2, wherein said means preventing rotation is formed by a ring disposed on an indent in the bottom piece and having resiliently deformable holding claws projecting radially star-like from it.

4. The combination according to claim 3, wherein said ring provided with the holding claws is made of plastic.

5. The combination according to any one of claim 1, wherein said bolt is provided with a thread on its bore-internal end, and said bottom piece having a complementary thread engaged by said bolt thread.

6. The combination according to claim 5, wherein said displacement effecting means includes a nut on the external end of the bolt, the length of the complementary thread on the external end of the bolt is at least equal to, but prefereably greater than, the displacement length required for the spreading of the locking elements.

7. The combination according to claim 6, wherein said bolt is a threaded bolt having a thread over its entire length.

8. The combination according to claim 7, wherein said displacement effecting means includes a screwdriver slot in the outer face end of the bolt for engagement by a screwdriver or other such tool.

9. The combination according to any one of claim 1, wherein a circumferential groove is provided on the outsides of the locking elements facing the bore wall, and an expansible ring holding the locking elements in the retracted position being disposed in said groove.

10. The combination according to claim 1, wherein each locking element has on its bottom end held on the bottom piece at least one projection, and a matching recess in the bottom piece and engaged by said projection to prevent any turning of the locking element relative to the bottom piece.

11. The combination according to claim 1, wherein said sleeve is deformable axially by a certain amount under the action of axial forces.

12. The combination according to claim 11, wherein said sleeve has at least one radial notch reducing its wall thickness.

13. The combination according to claim 1, comprising: an annular element which is compressible in the axial direction, said annular element being provided between said sleeve and said displacement effecting means.

* * * * *